(12) United States Patent
Lin et al.

(10) Patent No.: US 8,943,459 B2
(45) Date of Patent: Jan. 27, 2015

(54) COMPUTING DEVICE AND METHOD FOR TESTING LAYOUT OF POWER PIN OF CHIPSET ON CIRCUIT BOARD

(71) Applicants: ScienBiziP Consulting (Shen Zhen) Co., Ltd., Shenzhen (CN); Hon Hai Precision Industry Co., Ltd., New Taipei (TW)

(72) Inventors: Yu-Hsu Lin, Santa Clara, CA (US); Guang-Feng Ou, Wuhan (CN)

(73) Assignee: ScienBiziP Consulting (Shenzhen) Co., Ltd., Guangdong (CN)

( * ) Notice: Subject to any disclaimer, the term of this patent is extended or adjusted under 35 U.S.C. 154(b) by 0 days.

(21) Appl. No.: 14/065,616

(22) Filed: Oct. 29, 2013

(65) Prior Publication Data

US 2014/0317587 A1    Oct. 23, 2014

(30) Foreign Application Priority Data

Apr. 22, 2013  (CN) .......................... 2013 1 01402515

(51) Int. Cl.
*G06F 17/50* (2006.01)
(52) U.S. Cl.
CPC .................................. *G06F 17/5081* (2013.01)
USPC .......................................... 716/136; 716/137

(58) Field of Classification Search
USPC .......................... 716/118, 119, 122, 136, 137
See application file for complete search history.

(56) References Cited

U.S. PATENT DOCUMENTS

| 5,743,004 A * | 4/1998 | Chobot et al. .................. 29/830 |
| 8,302,067 B2 * | 10/2012 | Lee et al. ...................... 716/137 |
| 2006/0008194 A1 * | 1/2006 | Kagaya et al. .................... 385/1 |
| 2007/0008032 A1 * | 1/2007 | Kyu et al. ........................ 330/51 |
| 2011/0093828 A1 * | 4/2011 | Lee et al. ...................... 716/126 |

* cited by examiner

*Primary Examiner* — Vuthe Siek
(74) *Attorney, Agent, or Firm* — Novak Druce Connolly Bove + Quigg LLP

(57) ABSTRACT

A testing system for testing a layout of a power pin of a chipset on a circuit board includes a layout information obtaining module, a power pin sorting module, a transmission line sorting module, a transmission line length calculating module, and a report generating module. The layout information obtaining module obtains layout information of the printed circuit board. The power pin sorting module sorts the power pin from a number of pins of the chipset. The transmission line sorting module sorts transmission lines that are connected to the power pin and are located on outer layers of the printed circuit board. The transmission line length calculating module calculates a total length of the transmission lines sorted by the transmission line sorting module and compares the total length with a threshold length. The report generating module generates a testing report indicating whether or not the power pin is qualified.

15 Claims, 3 Drawing Sheets

COMPUTING DEVICE AND METHOD FOR TESTING LAYOUT OF POWER PIN OF CHIPSET ON CIRCUIT BOARD

BACKGROUND

1. Technical Field

The present disclosure relates to test a layout of signal lines, and particularly relates to a computing device and a method for testing a layout of power pins of chipsets on a circuit board.

2. Description of Related Art

A printed circuit board mechanically supports and electrically connects electronic components thereon. Power pins of the electronic components are supplied with a steady direct current (DC) power, such as 5V, 3V, 1.8V, and so on. The power pins are usually connected to a power source layer of the printed circuit board. However, the power source layer is located in an interior of the printed circuit board, and the electronic components are usually mounted on an outer surface of the printed circuit board. Therefore, a plurality of vias are defined in the printed circuit board to connect the power pins to the power source layer. However, if a transmission line between the power pin and the via is too long, a strong inference signal will be generated, which interferes with power supplied to the electronic component. Thus, a layout of the printed circuit board needs to be tested. However, existing testing technology depends heavily on human experience and judgment, which results in a low accuracy and a low efficiency.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language such as Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media are compact discs (CDs), digital versatile discs (DVDs), Blu-Ray discs, Flash memory, and hard disk drives.

Figure 1:
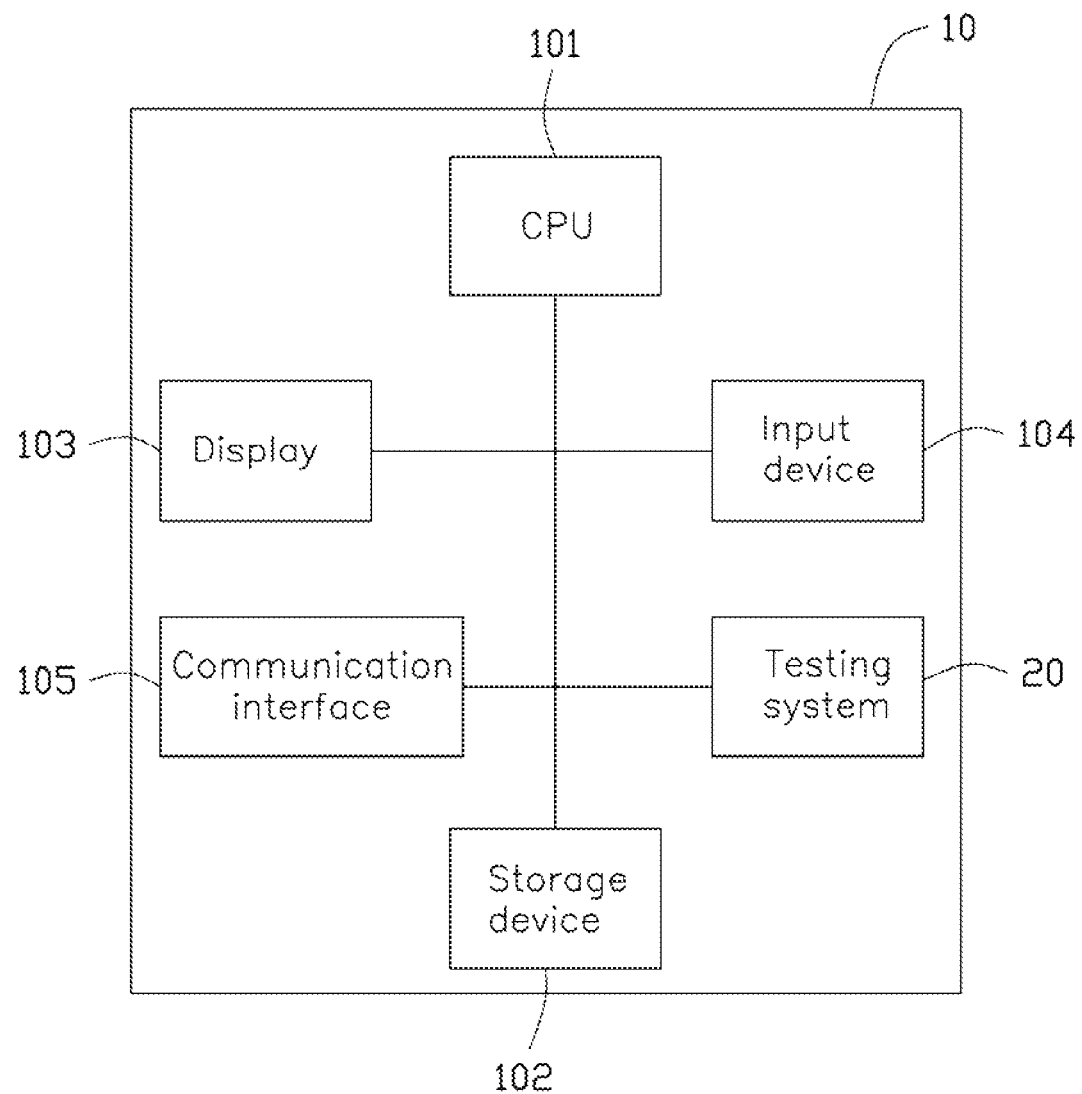
FIG. 1 is a block diagram of one embodiment of a computer device suitable for testing a layout of power pins of chipsets on a circuit board.

FIG. 1 shows one embodiment of a computing device 10. The computing device 10 includes a central processing unit (CPU) 101, a storage device 102, a display 103, an input device 104, and a communication interface 105. The computing device 10 may be a host computer, a workstation computer, a server computer, a tablet computer, or the like. A testing system 20 is employed and executed in the computing device 10 for testing a layout of power pins of chipsets on a circuit board.

The CPU 101 is connected to the storage device 102, the display 103, and the input device 104. The CPU 101 may include one or more processors and/or related chip sets to execute an operating system, programs, user and application interfaces, and any other functions of the computing device 10. The CPU 101 can include one or more microprocessors. For example, the CPU 101 may include "general purpose" microprocessors, a combination of general and special purpose microprocessors, instruction set processors, graphics processors, video processors, related chips sets, and/or special purpose microprocessors. The CPU 101 can also include onboard memory for caching purposes.

Information, such as programs and/or instructions used by the CPU 101, can be stored in the storage device 102. The storage device 102 can store a variety of information for various purposes. For example, the storage device 102 can store firmware for the computing device 10 such as a basic input/output system or operating system instructions, various programs, applications, or routines executed in the computing device 10, user interface functions, processor functions, and so forth. In addition, the storage device 102 can be used for buffering or caching during operation of the computing device 10.

The storage device 102 can include one or more tangible, computer-readable media. For example, the storage device 102 can include a volatile memory, such as a random access memory (RAM), and/or a non-volatile memory, such as read-only memory (ROM). The components can further include other forms of computer-readable media, such as non-volatile storage for continuous storage of data and/or instructions. The non-volatile storage can include flash memory, a hard drive, or any other optical, magnetic, and/or solid-state storage media. The non-volatile storage can be used to store firmware, data files, software, wireless connection information, and any other suitable data.

The display 103 can provide a visual output interface between the computing device 10 and a user. The visual output can include text, graphics, video, or any combination thereof. The display 103 can use LCD (liquid crystal display) technology, or LPD (light emitting polymer display) technology, although other display technologies can be used in other embodiments. In some embodiments, the display 103 can be a touch-sensitive display to accept input from the user based on tactile contact through a touch-sensitive surface.

The input device 104 can provide an input interface between the computing device 10 and a user. The input device 104 can be a keyboard, a mouse, or a touch pad, to input information.

The communication interface 105 can provide connectivity channels for receiving and transmitting information and/or for connecting to other computing devices. The communication interface 105 can represent, for example, a network interface card (NIC) or a network controller. The communication interface 105 can include a local area network (LAN) interface for connecting to a wired Ethernet-based network and/or a wireless LAN, such as an IEEE 802.11x wireless network. The communication interface 105 also can include a wide area network (WAN) interface that permits connection to the Internet.

Figure 2:
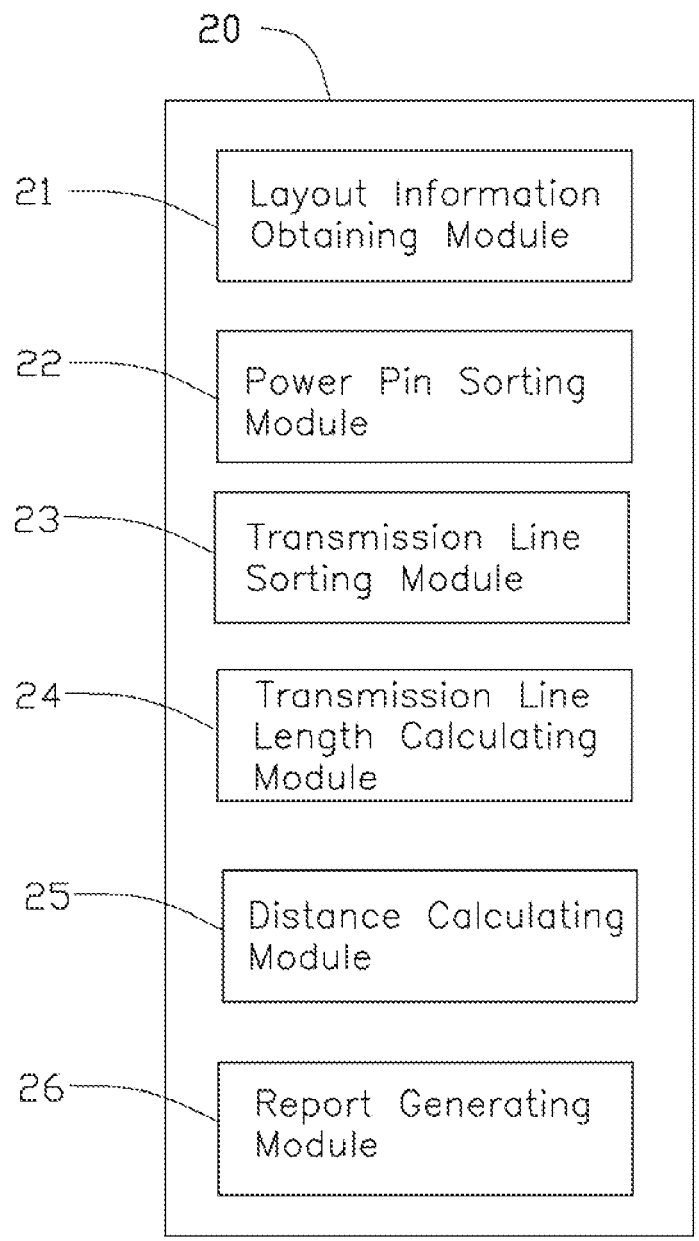
FIG. 2 is a block diagram of a testing system for testing a layout of power pins of chipsets on a circuit board.

FIG. 2 shows a functional block diagram of one embodiment of the testing system 20. The testing system 20 includes a layout information obtaining module 21, a power pin sorting module 22, a transmission line sorting module 23, a transmission line length calculating module 24, a distance calculating module 25, and a report generating module 26.

The layout information obtaining module 21 can obtain layout information of a printed circuit board. The layout information can include pin names, pin properties, transmission line names, transmission line properties, transmission line length, and transmission line positions of the layout pattern of the printed circuit board.

The power pin sorting module 22 can sort a pin having a pin property labeled "power." The pin having a pin property labeled "power" is a power pin that receives power from a power source layer in the printed circuit board.

The transmission line sorting module 23 can sort transmission lines that are connected to the above sorted "power" pin and are located on outer layers of the printed circuit board.

The transmission line length calculating module 24 can calculate a total length of the transmission lines sorted by the transmission line sorting module 23. The total length is compared to a threshold length.

The distance calculating module 25 can calculate a shortest distance between the sorted "power" pin and a nearest vent hole. The shortest distance is compared to a threshold distance.

The report generating module 26 can generate a testing report depicting whether or not the sorted "power" pin is qualified.

Figure 3:
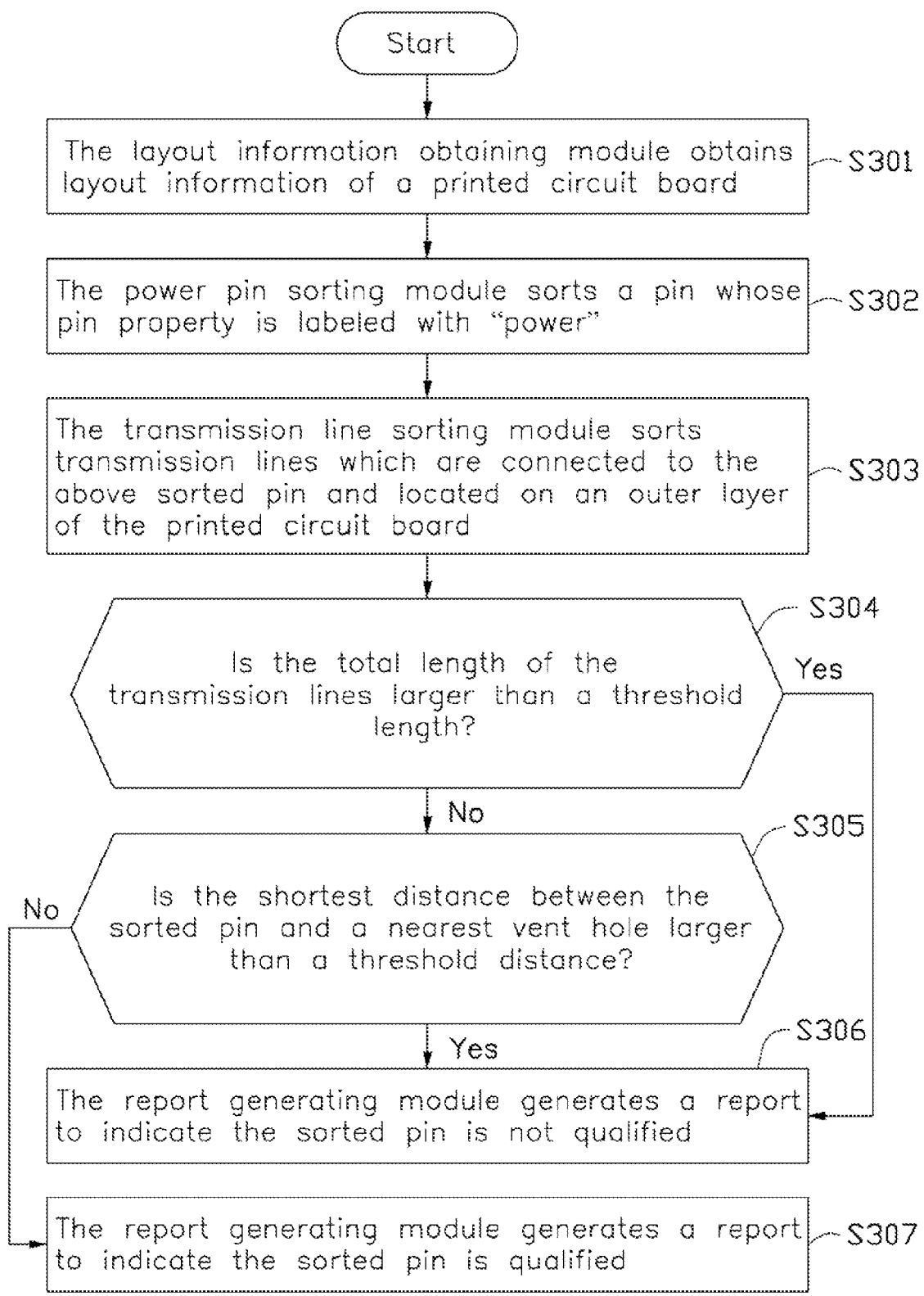
FIG. 3 is a flow chart showing one embodiment of testing a layout of power pins of chipsets on a circuit board.

FIG. 3 is a flowchart showing one embodiment of a method for testing a layout of power pins of chipsets on a circuit board. The method comprises the following steps.

In step S301, the layout information obtaining module 21 obtains layout information of a printed circuit board. The layout information can include pin names, pin properties, transmission line names, transmission line properties, transmission line length, and transmission line positions of the layout pattern of the printed circuit board.

In step S302, the power pin sorting module 22 sorts a pin having a pin property labeled "power."

In step S303, the transmission line sorting module 23 sorts transmission lines that are connected to the above-sorted pin and are located on an outer layer of the printed circuit board.

In step S304, the transmission line length calculating module 24 calculates a total length of the transmission lines sorted by the transmission line sorting module 23, and the total length is compared with a threshold length. If the total length is larger than the threshold length, step S306 is implemented. If the total length is not larger than the threshold length, step S305 is implemented.

In step S305, the distance calculating module 25 calculates a shortest distance between the sorted pin and a nearest vent hole, and the shortest distance is compared to a threshold distance. If the shortest distance is larger than the threshold distance, step S306 is implemented. If the shortest distance is not longer than the threshold distance, step S307 is implemented.

In step S306, the report generating module 26 generates a report to indicate that the sorted pin is not qualified.

In step S307, the report generating module 26 generates a report to indicate that the sorted pin is qualified.

Although numerous characteristics and advantages have been set forth in the foregoing description of embodiments, together with details of the structures and functions of the embodiments, the disclosure is illustrative only, and changes can be made in detail, especially in the matters of arrangement of parts within the principles of the disclosure to the full extent indicated by the broad general meaning of the terms in which the appended claims are expressed.

In particular, depending on the embodiment, certain steps or methods described may be removed, others may be added, and the sequence of steps may be altered. The description and the claims drawn for or in relation to a method may give some indication in reference to certain steps. However, any indication given is only to be viewed for identification purposes, and is not necessarily a suggestion as to an order for the steps.

What is claimed is:

1. A computing device for testing a layout of a power pin of a chipset on a circuit board, the computing device comprising:

a storage device;
a processor coupled to the storage device; and
one or more programs stored in the storage device and executed by the processor, the one or more programs comprising:
 a layout information obtaining module configured to obtain layout information of the printed circuit board;
 a power pin sorting module configured to sort the power pin from a plurality of pins of the chipset based on the layout information of the printed circuit board;
 a transmission line sorting module configured to sort transmission lines connected to the power pin and located on outer layers of the printed circuit board;
 a transmission line length calculating module configured to calculate a total length of the transmission lines sorted by the transmission line sorting module and compare the total length with a threshold length; and
 a report generating module configured to generate a testing report indicating whether the power pin is qualified based on a compared result of the total length and the threshold length.

2. The computing device of claim 1, wherein the layout information includes pin properties, transmission line length, and transmission line positions of the layout pattern of the printed circuit board.

3. The computing device of claim 1, further comprising a distance calculating module, wherein the distance calculating module is configured to calculate a shortest distance between the power pin and a nearest vent hole.

4. The computing device of claim 3, wherein the distance calculating module is configured to compare the shortest distance with a threshold distance.

5. The computing device of claim 4, wherein the report generating module is further configured to generate the testing report indicating whether the power pin is qualified based on a compared result of the shortest distance and the threshold distance.

6. A circuit board, connected to a computing device comprising at least one processor, the at least one processor configured to:

obtain layout information of the printed circuit board;
sort the power pin from a plurality of pins of the chipset based on the layout information;
sort transmission lines which are connected to the power pin and located on an outer layer of the printed circuit board;
calculate a total length of the sorted transmission lines;

compare the total length with a threshold length;

generate a testing report indicating whether the power pin is qualified based on a compared result of the total length and the threshold length.

7. The circuit board of claim 6, wherein the layout information includes pin properties, transmission line length, and transmission line positions of the layout pattern of the printed circuit board.

8. The circuit board of claim 6, wherein the processor is further configured to calculate a shortest distance between the power pin and a nearest vent hole.

9. The circuit board of claim 8, wherein the processor is further configured to compare are the shortest distance with a threshold distance.

10. The circuit board of claim 9, wherein the processor is further configured to generate the testing report indicating whether the power pin is qualified also based on a compared result of the shortest distance and the threshold distance.

11. A non-transitory computer-readable storage medium having instructions stored thereon that, when executed by at least one processor of a computing device, cause the computing device to perform a method for testing a layout of a power pin of a chipset on a circuit board, the method comprising:

obtaining layout information of the printed circuit board;

sorting the power pin from a plurality of pins of the chipset based on the layout information;

sorting transmission lines which are connected to the power pin and located on outer layer of the printed circuit board;

calculating a total length of the sorted transmission lines;

comparing the total length with a threshold length; and generating a testing report indicating whether the power pin is qualified based on a compared result of the total length and the threshold length.

12. The method of claim 11, wherein the layout information includes pin properties, transmission line length, and transmission line positions of the layout pattern of the printed circuit board.

13. The method of claim 11, further comprising calculating a shortest distance between the power pin and a nearest vent hole.

14. The method of claim 13, further comprising comparing the shortest distance with a threshold distance.

15. The method of claim 14, further comprising generating the testing report indicating whether the power pin is qualified also based on a compared result of the shortest distance and the threshold distance.

* * * * *